(12) United States Patent
Soliman et al.

(10) Patent No.: US 8,534,399 B2
(45) Date of Patent: Sep. 17, 2013

(54) HYBRID PROPULSION SYSTEM

(75) Inventors: Ihab Soliman, Warren, MI (US); Andrew Silveri, Royal Oaks, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 913 days.

(21) Appl. No.: 11/677,513

(22) Filed: Feb. 21, 2007

(65) Prior Publication Data
US 2008/0196952 A1   Aug. 21, 2008

(51) Int. Cl.
*B60K 6/20*   (2007.10)
*B60W 20/00*   (2006.01)

(52) U.S. Cl.
USPC .................................. 180/65.21; 180/65.265

(58) Field of Classification Search
None
See application file for complete search history.

(56) References Cited

U.S. PATENT DOCUMENTS

| | | | | |
|---|---|---|---|---|
| 4,449,618 A * | 5/1984 | Suga et al. | ........... | 192/3.31 |
| 5,460,584 A * | 10/1995 | Kusaka et al. | ........... | 477/169 |
| 5,951,614 A * | 9/1999 | Tabata et al. | ........... | 701/54 |
| 6,052,640 A * | 4/2000 | Wu | ........... | 701/67 |
| 6,158,541 A | 12/2000 | Tabata et al. | | |
| 6,164,400 A | 12/2000 | Jankovic et al. | | |
| 6,183,389 B1 * | 2/2001 | Tabata | ........... | 477/5 |
| 6,428,444 B1 * | 8/2002 | Tabata | ........... | 477/3 |
| 6,459,980 B1 | 10/2002 | Tabata et al. | | |
| 6,484,832 B1 * | 11/2002 | Morisawa et al. | ........... | 180/65.225 |
| 6,497,635 B2 * | 12/2002 | Suzuki | ........... | 477/3 |
| 6,506,139 B2 | 1/2003 | Hirt et al. | | |
| 6,512,967 B2 | 1/2003 | Osterberg et al. | | |
| 6,537,178 B1 * | 3/2003 | Takizawa et al. | ........... | 477/76 |
| 6,715,572 B2 * | 4/2004 | Shimabukuro et al. | ........... | 180/65.6 |
| 6,719,076 B1 | 4/2004 | Tabata et al. | | |
| 6,775,601 B2 | 8/2004 | MacBain | | |
| 6,827,167 B2 | 12/2004 | Cikanek et al. | | |
| 6,835,160 B2 | 12/2004 | Kitano et al. | | |
| 6,837,323 B2 | 1/2005 | Denton et al. | | |
| 6,846,265 B2 * | 1/2005 | Yamamoto et al. | ........... | 477/3 |
| 6,853,893 B2 | 2/2005 | Corcione et al. | | |
| 6,862,511 B1 | 3/2005 | Phillips et al. | | |
| 6,907,337 B2 | 6/2005 | Phillips et al. | | |
| 6,910,329 B2 | 6/2005 | Bunting et al. | | |
| 6,915,198 B2 | 7/2005 | Phillips et al. | | |
| 6,941,830 B2 | 9/2005 | Ibamoto et al. | | |
| 6,988,976 B2 | 1/2006 | Potter | | |

(Continued)

FOREIGN PATENT DOCUMENTS

| | | |
|---|---|---|
| CN | 1891547 A | 1/2007 |
| DE | 197 24 681 A1 | 2/1998 |
| JP | 2005299797 | 10/2005 |
| JP | 2005299797 A * | 10/2005 |

OTHER PUBLICATIONS

Office Action of Chinese Application No. 200810081915.4, Issued Apr. 27, 2012, State Intellectual Property Office of PRC, 2 Pages.

*Primary Examiner* — J. Allen Shriver, II
*Assistant Examiner* — Chiedu Chibogu
(74) *Attorney, Agent, or Firm* — Julia Voutyras; Alleman Hall McCoy Russell & Tuttle LLP

(57) ABSTRACT

A hybrid vehicle propulsion system including, an internal combustion engine coupled to an input of the fixed-ratio transmission is disclosed. In one example, a torque differential across a torque converter is reduced to assist torque converter clutch lockup. The system can improve shift feel during at least some conditions.

10 Claims, 9 Drawing Sheets

(56) References Cited

U.S. PATENT DOCUMENTS

| | | |
|---|---|---|
| 6,991,053 B2 | 1/2006 | Kuang et al. |
| 6,994,360 B2 | 2/2006 | Kuang et al. |
| 7,010,406 B2 | 3/2006 | Sah et al. |
| 7,071,642 B2 | 7/2006 | Wilton et al. |
| 7,086,301 B2 | 8/2006 | Sakamoto et al. |
| 7,343,993 B2 * | 3/2008 | Dong et al. ............... 180/65.23 |
| 2001/0044683 A1 | 11/2001 | Takaoka et al. |
| 2002/0061803 A1 * | 5/2002 | Aoki ................................ 477/3 |
| 2003/0000751 A1 * | 1/2003 | Denton et al. ............. 180/65.7 |
| 2003/0186778 A1 * | 10/2003 | Yamamoto et al. ............... 477/5 |
| 2004/0014565 A1 * | 1/2004 | Oshima et al. ............... 477/182 |
| 2004/0034460 A1 | 2/2004 | Folkerts et al. |
| 2004/0163862 A1 * | 8/2004 | Yamaguchi ................. 180/65.2 |
| 2004/0204286 A1 | 10/2004 | Stridsberg |
| 2005/0003928 A1 * | 1/2005 | Niki et al. ........................ 477/5 |
| 2005/0009665 A1 * | 1/2005 | Cho .................................. 477/5 |
| 2005/0060079 A1 | 3/2005 | Phillips et al. |
| 2005/0064987 A1 | 3/2005 | Budal et al. |
| 2005/0164827 A1 * | 7/2005 | Beaty et al. ...................... 477/3 |
| 2005/0228553 A1 | 10/2005 | Tryon |
| 2005/0284674 A1 * | 12/2005 | Menne et al. ............... 180/65.2 |
| 2006/0070779 A1 | 4/2006 | Kuang et al. |
| 2006/0270519 A1 * | 11/2006 | Kamada et al. ................... 477/3 |
| 2008/0004779 A1 * | 1/2008 | Sah ................................ 701/51 |

* cited by examiner

HYBRID PROPULSION SYSTEM

BACKGROUND AND SUMMARY

In a hybrid powertrain, an electric motor may be used to absorb and/or supply torque to improve powertrain efficiency and fuel economy performance. The hybrid powertrain may also include an energy storage device, such as a battery, that can power the motor or store absorbed energy. In one example, the efficiency of a hybrid powertrain may be improved by engaging the lockup clutch of a torque converter earlier when the internal combustion engine has low load by using the electric motor to provide additional torque to meet driver demand. However, as the battery state of charge decreases, the electric motor may be unable to provide supplemental torque. Thus, lockup of the torque converter may occur later so that the internal combustion engine may provide torque output to meet driver demand. One approach that adjusts the lockup schedule of the torque converter based on battery state of charge in order to improve powertrain efficiency is described in U.S. Patent Application No. 2005/0003928.

The inventors herein have recognized that the above approach may have some issues. In particular, during some operating conditions, the lockup clutch may be unable to lock the torque converter. For example, early torque converter lockup may result at a condition when a considerable torque differential may exist across the torque converter greater than that of the capacity of the lockup clutch. Thus, early torque converter lockup may cause deteriorated driving conditions due to the rough or unsuccessful engagement of the lockup clutch.

The above issues may be addressed by, in one example, a hybrid vehicle propulsion system comprising an internal combustion engine coupled to a multiple fixed-ratio transmission, one or more electric motors powered at least by a battery, wherein at least one of the internal combustion engine and electric motors supply torque to the drive wheels, and a controller for adjusting the torque output of the hybrid propulsion system, the controller adjusting the transmission to shift at a first level during a first battery state of charge, and adjusting the transmission to shift at a second level that is higher than the first level in a second state where the battery state of charge is lower than the first battery state of charge.

Thus, efficiency and fuel economy of a hybrid powertrain may be improved while meeting driver demand by adjusting the transmission shifting based on battery state of charge, while reducing deteriorated driving conditions.

Further, in another example, the transmission shifting and the torque converter lockup state may be adjusted based on battery state of charge so that torque differential of the torque converter may be reduced and smoother engagement of the lockup clutch may be achieved during selected engine conditions. By using the electric motor to provide supplemental torque to meet driver demand, the impeller (or transmission input) torque can be reduced so that the capacity of the lockup clutch will be sufficient to smoothly lock the torque converter at the desired operating condition. In this way, hybrid powertrain efficiency and fuel efficiency may be improved while facilitating smooth distribution of torque from the hybrid powertrain torque sources to meet driver demand.

Further, in yet another example, the transmission shifting and the torque converter lockup state may be adjusted based on the distribution of engine power between multiple propulsion paths in order to improve overall hybrid powertrain efficiency. In certain operating conditions, a portion of the engine power may be distributed to one propulsion path to power the electric motor (downstream of the transmission) and/or charge the battery while the remaining portion of the engine power will be transferred through the transmission in another propulsion path to provide power to the drive wheels. In these conditions, the transmission shifting and torque converter lockup scheduling may be adjusted to compensate for the reduction in net input power to the transmission. In this way, hybrid powertrain efficiency and fuel efficient may be improved while meeting the driver demand.

In still another example, a control architecture for a hybrid propulsion system may be provided that considers the tractive effort capabilities of the respective hybrid powertrain torque sources for a selected operating condition and adjusts the transmission shifting and the torque converter lockup state in order to distribute power flow accordingly. In particular, the control architecture may adjust the transmission shifting and torque converter lockup state based on the tractive effort capabilities of the electric torque sources, including the battery state of charge. In this way, hybrid powertrain efficiency and fuel efficiency may be improved while meeting driver demand.

DETAILED DESCRIPTION

Figure 1:
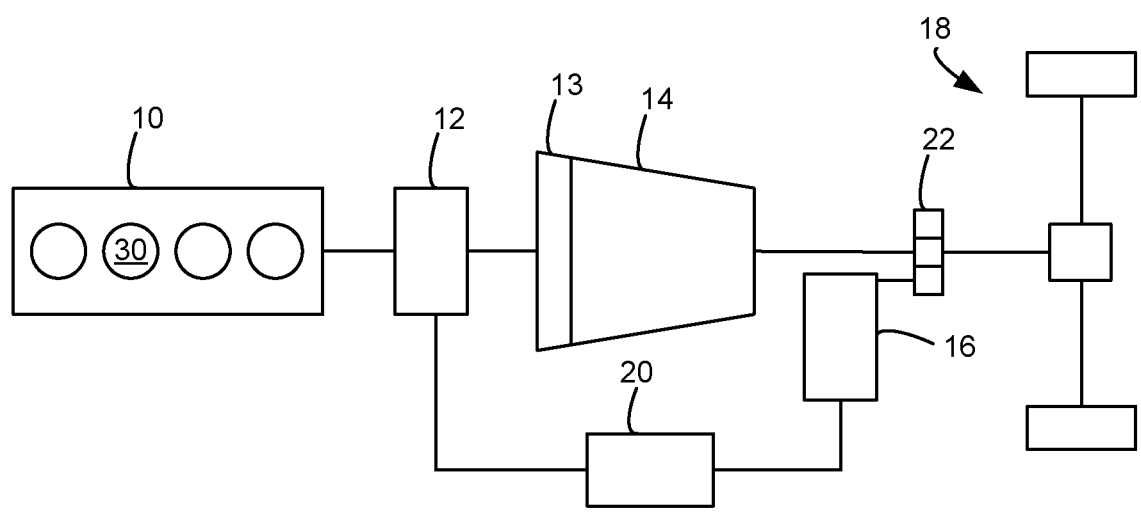
FIG. 1 is a schematic diagram of a hybrid propulsion system of the present disclosure.

FIG. 1 illustrates an exemplary embodiment of a hybrid propulsion system for a vehicle. In particular, the exemplary powertrain configuration may be used with the disclosed powertrain control and shift scheduling approach. In this example, the hybrid propulsion system may include an Atkinson cycle internal combustion engine (ICE) 10 having one or more cylinders 30, a multiple fixed-ratio transmission 14, final drive/wheels 18 or other suitable device for delivering propulsive force to the ground surface, and two electric energy conversion devices 12 and 16. The first electric energy conversion device (CISG) 12 may be integrated at the output of engine 10 and further may be connected to the impeller of a torque converter 13 connected to transmission 14, thus providing starter/generator capabilities. The second electric energy conversion device (ERAD) 16 may be coupled to the output of transmission 14 through planetary gear set 22 which may be connected to a final/output drive, thus providing additional propulsion capabilities in either an electric drive or hybrid drive mode. Further, electric energy conversion devices 12 and 16 may be in electrical communication with battery 20. Note that electric energy conversion devices 12 and 16 may be referred to herein as motors and/or generators.

In some embodiments, electric energy conversion devices 12 and 16 may be used as generators to convert mechanically generated power into electric power to be stored in the battery. For example, under some conditions, such as low load conditions only the ERAD motor may provide torque to the final drive/wheels to meet driver demand. Furthermore, the ERAD motor may advantageously provide/absorb power to modify various operating states of the hybrid powertrain to improve powertrain efficiency and drivability (discussed in further detail below with reference to FIGS. 3-7).

It should be appreciated that electric energy conversion devices 12 and 16 may be powered by sources other than the battery under some operating conditions. For example, the IC engine 10 may generate power that may be used by the electric motors. Also, note in some embodiments, the ERAD motor may operatively communicate with gears configurations other than a planetary gear configuration.

In the exemplary configuration, the vehicle may be propelled by at least one of the engine or the motors. In this particular example, a rear wheel drivetrain configuration is shown however it should be appreciated that other drivetrain configurations may be implemented, such as front wheel drive or all wheel drive. In other words, the IC engine, the CISG motor, and the ERAD motor may provide torque only to the front wheels. Alternatively, the three torque sources may provide torque to all of the wheels. In another example, the ERAD motor may generate torque to the front wheels and the CISG motor and IC engine may provide torque to the rear wheels or vice versa. In some embodiments, the ERAD motor may be coupled downstream of the multiple fixed-ratio transmission. For example, the ERAD motor may be coupled directly to the output of the transmission. As another example, the ERAD motor may be coupled to the final drive/wheels. As yet another example, the ERAD motor may be coupled downstream of the multiple fixed-ratio transmission and may provide torque output via various gear sets, such as a planetary gear set, for example.

Note that the different torque sources may provide torque output to at least one of if not all of the wheels during various operating conditions. Moreover, in some embodiments, torque produced by the various torque sources may be distributed via different mechanical and/or electrical paths to the different wheels based on various operating conditions.

While FIG. 1 shows one example hybrid propulsion configuration, various others may be used as noted herein. With regards to a full series type hybrid propulsion system, the engine may be operated to generate a form of energy suitable for use by the one or more motors. For example, with a full series type hybrid electric vehicle (HEV), the engine may generate electricity via a motor/generator that may be used to power an electric motor for propelling the vehicle. As another example, an engine may be operated to provide pump work to a hydraulic or pneumatic system that may be used to power a hydraulic or pneumatic motor for propelling the vehicle. As yet another example, an engine may be operated to provide kinetic energy to a flywheel or similar device for later application at the drive wheels.

With regards to a parallel type hybrid propulsion system, the engine and one or more motors may be operated independently of each other. As one example, an engine may be operated to provide torque to the drive wheels, while a motor (e.g. electric, hydraulic, etc.) may be selectively operated to add or remove torque delivered to the wheels. As another example, the engine may be operated with out the motor or the motor may be operated without the engine.

Further, with either series or parallel type propulsion systems, or combinations thereof, an energy storage device may be included to enable energy generated by the engine and/or motor to be stored for later use by one or more motors. For example, a regenerative braking operation may be performed, where an electric energy conversion device (motor/generator) is used to convert kinetic energy at the drive wheels to a form of energy suitable for storage at the energy storage device. For example, with regards to a HEV, the motor or a separate generator may be used to convert torque at the wheels or torque produced by the engine into electrical energy that may be stored at the energy storage device. A similar approach may be applied to other types of hybrid propulsion systems including hydraulic, pneumatic, or those including flywheels. Note that in some embodiments, separate motors and/or generators may be used to cooperatively generate electrical power as well as output torque.

In the illustrated embodiment, electric energy conversion device 12 and electric energy conversion device 16 may be provided on each side of the transmission or on each side of a transmission element. In this example, one or more of electric energy conversion devices 12 and 16 may be operated to supply or absorb torque from the driveline with or without torque being provided by engine 10. Regenerative braking to charge battery 20 may be achieved with the configuration of FIG. 1 by transmitting torque from the drive wheels to electric energy conversion device 12 via the transmission, where electric energy conversion device 12 can perform an electric power generator function or alternatively electric energy conversion device 16 may perform an electric power generator function, further still a separate generator may be included. Still other configurations are possible. Therefore, it should be appreciated that other suitable hybrid configurations or variations thereof may be used with regards to the approaches and methods described herein.

Continuing with FIG. 1, the hybrid propulsion system may include a multiple fixed gear ratio transmission. Accordingly, a torque converter may be included to transmit power from the electric energy conversion device and/or the internal combustion engine to the transmission. The torque converter may include an impeller (or pump) connected to a flywheel powered by the electric energy conversion device and/or the internal combustion engine. The impeller may be sealed in the torque converter housing and may be in fluid communication with a turbine that is connected to the transmission input shaft. The torque converter may transmit power from the electric energy conversion device and/or the internal combustion engine to the transmission by pumping hydraulic (transmission) fluid through the spinning impeller to the turbine. The force of the hydraulic fluid causes the turbine to spin creating torque on the transmission input shaft. A slippage condition may exist when the turbine speed is lower than the impeller speed. This difference in rotation speed causes friction and heat to be generated which reduces the efficiency of the torque converter further resulting in reduced fuel economy performance.

Furthermore, as engine speed increases, the speed of the turbine increases to a point where the turbine and the impeller spin at substantially the same rate. During this condition, known as the coupling point (or coupling speed), the turbine spins faster than the hydraulic fluid can exit the turbine, and the net angular momentum of the exiting fluid is in the same direction as the turbine's rotation causing friction to be reduced. The reduction in friction results in an improvement in the efficiency of the torque converter and, in turn, improved fuel economy performance.

However, as engine speed increases exceeding the coupling point, slippage can occur resulting in an amount of friction and heat that is increased due to the magnitude of the speed of the engine. Moreover, slippage at such engine speeds may result in considerably reduced torque converter efficiency. Thus, to maintain a high efficiency of the torque converter, a lockup clutch may be engaged to physically link the impeller with the turbine causing the components to rotate at the same speed with no slippage. Lockup clutch operation may be controlled based on various operating conditions and lockup clutch and torque converter control strategies will be discussed in further detail below.

Operation of transmission 14 along with torque converter 13 may be controlled to provide suitable torque output to the drive wheels according to driver demand. In one example, transmission operation may be adjusted by changing the timing of the shift schedule such that shifting between gears of the transmission may occur earlier or later in the powerband of the engine based on desired torque output. For example, under low engine load (i.e. low driver demand), the shift schedule may be adjusted so that shifts occur earlier to improve fuel economy performance since the desired torque output can be met in all gears. Furthermore, under high engine load (high driver demand) the shift schedule may be adjusted so shifts occur later to improve torque output and performance of the engine since the desired torque output may not necessarily be met in all gears. Accordingly, by varying the shift schedule of the transmission driver demand may be met while also improving fuel economy performance. Shift schedule control strategies will be discussed in further detail below.

An exemplary hybrid propulsion system may include one or more electronic control units (not shown) to control operation of the hybrid powertrain. An exemplary controller may include microprocessor unit (CPU), input/output ports, an electronic storage medium (ROM), random access memory (RAM), keep alive memory (KAM), and a data bus among other components. The controller(s) may receive various signals from sensors distributed throughout the vehicle. For example, a plurality of sensors may detect various operating conditions including engine and transmission operating conditions, battery and motor/generator operating conditions, and driver input, among others. The sensor signals may be processed and/or stored in the controller, and the controller may send various feedback control signals to actuators in the different vehicle systems based on calculations from the sensor signals in order to control vehicle operation.

In some embodiments vehicle operation may be controlled by a single electronic control unit. Further, in some embodiments different controllers may control different vehicle systems. For example, a controller may be designated to control aspects of the engine and/or transmission operation, while a different controller may be designated to control battery and electric power storage and output. In some embodiments, a vehicle may include a hierarchy of controllers which may collect, store, and process input signal information and further generate feedback control information. For example, one or more controllers may collect and store raw signal data and perform low level signal processing, such as signal enhancement, and various calculations. The processed signal data may be sent to one or more different controllers to perform additional processing and high level analysis as well as generate operational feedback. Alternatively, in some embodiments a single controller (or group of controllers) may control most if not all aspects of vehicle operation.

Power/energy (or propulsion) flow paths of the hybrid powertrain system of FIG. 1 will now be discussed in more detail. Power/energy flow paths show how the powertrain systems provide power output according to driver demand to the final drive/wheels (or during some conditions how power may be directed to energy storage sources, e.g. a regenerative braking flow path). In general, driver demand at a given vehicle speed can be interpreted as a desired tractive effort (or desired torque) at the drive wheels to achieve a desired vehicle response (acceleration/deceleration), an equation for the desired vehicle response is provided:

$$\text{vehicle acceleration} = a_{veh} = \frac{F_{T\_DES} - F_{ROAD}}{\left(\frac{W_{veh}}{g}\right)},$$

where $F_{T\_DES}$: desired tractive effort by the driver, $F_{ROAD}$: road load at the given speed, $$\frac{W_{veh}}{g}:$$

vehicle mass

Figure 2:
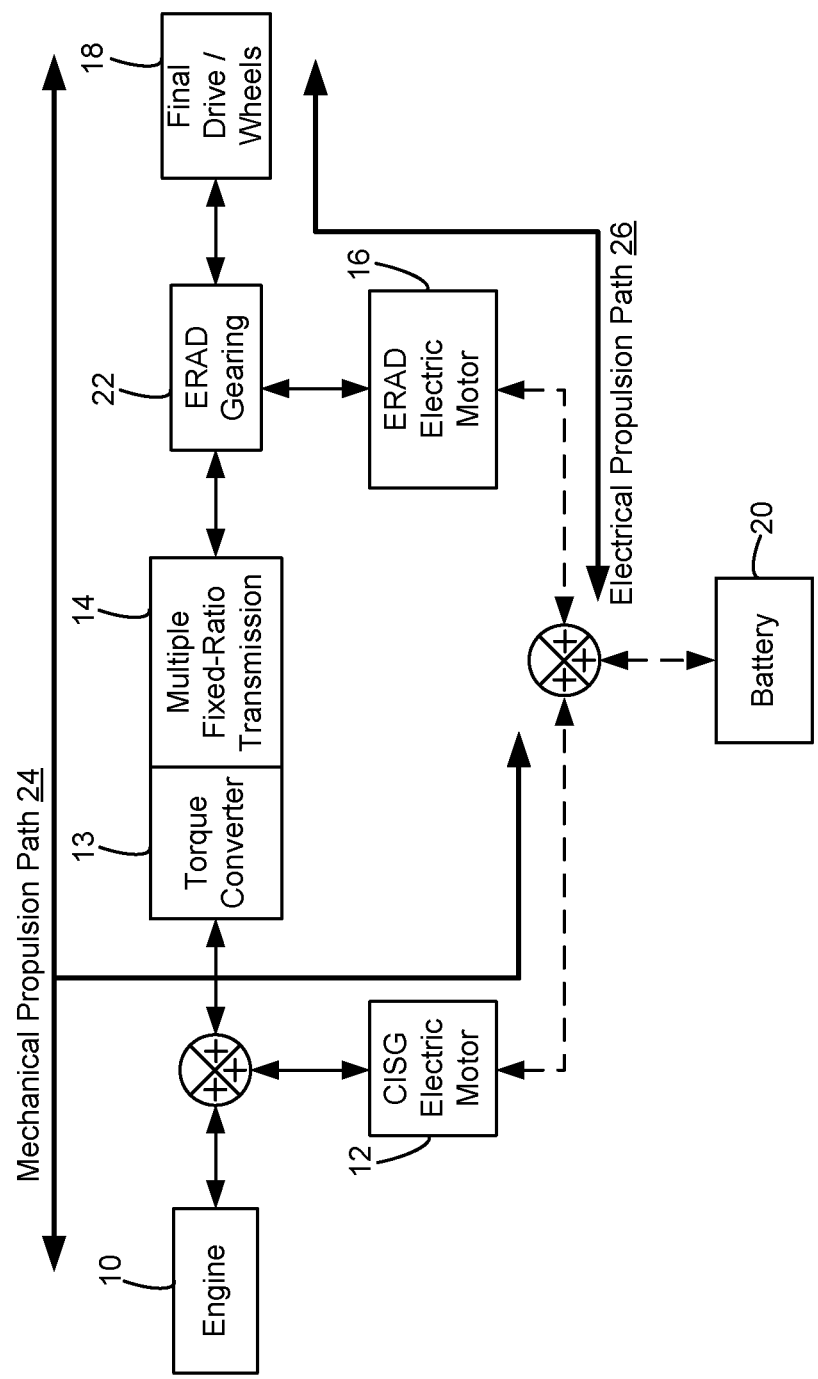
FIG. 2 is a propulsion flow path diagram of the hybrid propulsion system of FIG. 1.

According to this general equation, a powertrain with a multiple fixed gear ratio transmission and engine may achieve the driver desired tractive effort only by manipulating a few degrees of freedom, namely, the transmission state (torque converter state, gear ratio) and engine torque. In other words, since there is only one power source (engine) and power flow (mechanical), the tractive effort is provided by the engine in order to satisfy the driver demand, an equation for the desired tractive effort of the single mechanical path configuration is provided:

$$F_{T\_DES} = F_{T\_ENG} = \frac{\lfloor T_{ENG} \cdot i_{TQ} \cdot i_G \cdot \eta_G \rfloor \cdot i_{FD} \cdot \eta_{FD}}{R_{TIRE}},$$

$$\text{vehicle acceleration} = a_{veh} = \frac{F_{T\_ENG} - F_{ROAD}}{\left(\frac{W_{veh}}{g}\right)},$$

where, $T_{ENG}$: engine torque, $i_{TQ}$: torque multiplication by converter, $i_G$: gear ratio, $i_{FD}$: final drive ratio
$\eta_G$: transmission gearbox efficiency, $\eta_{FD}$: final drive efficiency, $R_{TIRE}$: effective tire radius In contrast, in a hybrid electric vehicle with multiple power sources (engine and battery) there can be multiple vehicle propulsion (mechanical and electrical) paths for achieving the driver desired tractive effort at a given vehicle speed. Specifically with reference to FIG. 2, the power/energy flow paths corresponding to the hybrid propulsion system configuration of FIG. 1 are shown. The hybrid powertrain configuration includes mechanical propulsion path 24 which includes engine 10 and CISG motor 12 which generate and transfer power through the torque converter 13, fixed-ratio transmission 14 and planetary gear set 22 to final drive/wheels 18. Note that although this path is referred to as the mechanical path, under some conditions the CISG motor 12 may use electrical power provided by battery 20. Further, mechanical propulsion path 24 may change based on various operating conditions. For example, if the state of charge of battery 20 is high then engine 10 may not be required to produce power so, in this case, the engine may be excluded from the mechanical propulsion path. As another example, state of charge of battery 20 may be low so engine 10 may produce the power output for the mechanical path and CISG motor 12 may be excluded. In yet another example where the driver demand is high, both the CISG motor 12 and engine 10 may produce the power output for the mechanical path.

The hybrid powertrain configuration further includes electrical flow path 26 which includes ERAD motor 16 which utilizes electrical power, under some conditions from battery 20, and transfers the power via planetary gear set 22 (or other mechanism) to final drive/wheels 18.

It should be appreciated that these flow paths are exemplary and that various other hybrid propulsion system configurations may be implemented that include additional motors/engines and may have additional power/energy flow paths. In some embodiments, the ERAD motor may be omitted and the tractive effort distribution may be split between the IC engine and the CISG motor. Further, in some embodiments, the CISG motor may be omitted and the tractive effort distribution may be split between the IC engine and the ERAD motor. Further, in some embodiments, the CISG motor and engine may be coupled to the final drive/wheels on one drive axle and the ERAD motor may be coupled to a final drive or wheels on another drive axle.

In the illustrated embodiment and configuration shown in FIG. 1 (RWD-HEV application), there are three torque sources: the engine, the CISG motor and the ERAD motor which can all provide a tractive effort at the drive wheels to meet driver demand, equations for the total tractive effort capabilities of the example hybrid configuration are provided below. $F_{T\_DES} = F_{T\_ENG} + F_{T\_CISG} + F_{T\_ERAD} = F_{T\_TOTAL}$, $$\text{vehicle acceleration} = a_{veh} = \frac{F_{T\_TOTAL} - F_{ROAD}}{\left(\frac{W_{veh}}{g}\right)}$$

$$F_{T\_ENG} = \frac{[T_{ENG} \cdot i_{TQ} \cdot i_G \cdot \eta_G] \cdot i_{FD} \cdot \eta_{FD}}{R_{TIRE}},$$

$$F_{T\_CISG} = \frac{[T_{CISG} \cdot i_{TQ} \cdot i_G \cdot \eta_G] \cdot i_{FD} \cdot \eta_{FD}}{R_{TIRE}},$$

$$F_{T\_ERAD} = \frac{[T_{ERAD} \cdot i_{ERAD}] \cdot i_{FD} \cdot \eta_{FD}}{R_{TIRE}}$$

$$F_{T\_TOTAL} = \frac{[(T_{ENG} + T_{CISG}) \cdot i_{TQ} \cdot i_G \cdot \eta_G + T_{EARD} \cdot i_{ERAD}] \cdot i_{FD} \cdot \eta_{FD}}{R_{TIRE}},$$

where, $F_{T\_CISG}$: tractive effort from CISG, $F_{T\_ERAD}$: tractive effort from ERAD, $i_{ERAD}$: ERAD gear ratio to motor $T_{CISG}$: torque provided by the CISG, $T_{ERAD}$: torque provided by the ERAD $\eta_G$: transmission gearbox efficiency, $i_G$: transmission gear ratio, $i_{TQ}$: transmission torque converter torque ratio $\eta_{FD}$: final drive efficiency, $i_{FD}$: final drive ratio Note that the torques provided by the CISG and ERAD motors are given by equations:

$$\Rightarrow T_{CISG} = \frac{P_{CISG} \cdot \eta_{CISG}}{\omega_{ENG}},$$

$$\eta_{CISG} = \begin{cases} \eta_{CISG\_E2M}, & \text{motoring} \\ \frac{1}{\eta_{CISG\_M2E}}, & \text{generating} \end{cases} \quad T_{ERAD} = \frac{P_{ERAD} \cdot \eta_{ERAD}}{\omega_{ERAD}},$$

$$\eta_{ERAD} = \begin{cases} \eta_{ERAD\_E2M}, & \text{motoring} \\ \frac{1}{\eta_{ERAD\_M2E}}, & \text{generating} \end{cases}$$

$$\Rightarrow P_{BAT} = P_{CISG} + P_{ERAD}$$

where $P_{CISG}$: CISG power, $P_{ERAD}$: ERAD power, $P_{BAT}$: battery power, $\eta_{CISG}$: CISG efficiency, $\eta_{ERAD}$: ERAD efficiency, $\omega_{ERAD}$: ERAD motor speed, $\omega_{ENG}$: engine speed $T_{CISG}$: torque provided by the CISG motor, $T_{ERAD}$: torque provided by the ERAD motor The above equations show that the available tractive effort to meet driver demand may take into account various operating conditions which may be determined based on powertrain operating states/modes as well as operating efficiencies of the respective hybrid powertrain elements. In particular, tractive effort capabilities of the CISG and ERAD motor change based on their operating speeds, efficiency and available electrical power. Note that the available power may come solely from the battery or it may include a portion of engine power in certain operating modes. Further, the state of the torque converter and transmission as well as the transmission operating efficiency may affect the tractive effort capabilities of the IC engine and the CISG motor. Note that these equations are exemplary and that other parameters may be taken into account when determining the tractive effort capabilities of the torque sources.

As will be appreciated by one of ordinary skill in the art, the specific routines described below in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated acts or functions may be repeatedly performed depending on the particular strategy being used. Further, these figures may graphically represent code to be programmed into the computer readable storage medium in a controller.

In an exemplary embodiment, a control approach may be applied to the above described hybrid propulsion system, that takes advantage of the additional power sources and propulsion flow paths for vehicle propulsion. The control approach is given by continuously taking into account the tractive effort capabilities (i.e. acceleration capabilities) of all torque sources for a given vehicle operating condition and distributing power flow accordingly. In one example, power flow may be distributed based on the tractive effort capabilities of each propulsion path (i.e. mechanical and electrical) and adjusting the state of the transmission. By adjusting the state of the transmission according to the tractive effort capabilities of the flow paths, the hybrid powertrain may be controlled to improved efficiency and fuel economy performance while providing torque output to meet driver demand.

In such an approach additional degrees of freedom are available for adjusting control of the propulsion system due to the multiple power sources and energy flow paths, whereas a propulsion system with a single mechanical energy flow path may be restricted in the degrees available for system control. Further, note that the although the hybrid system provides more control freedom under various operating conditions, the approach automatically operates the same as the conventional powertrain system having a single mechanical flow path as the additional torque sources lose their tractive effort capabilities with changing vehicle operating conditions.

Figure 3:
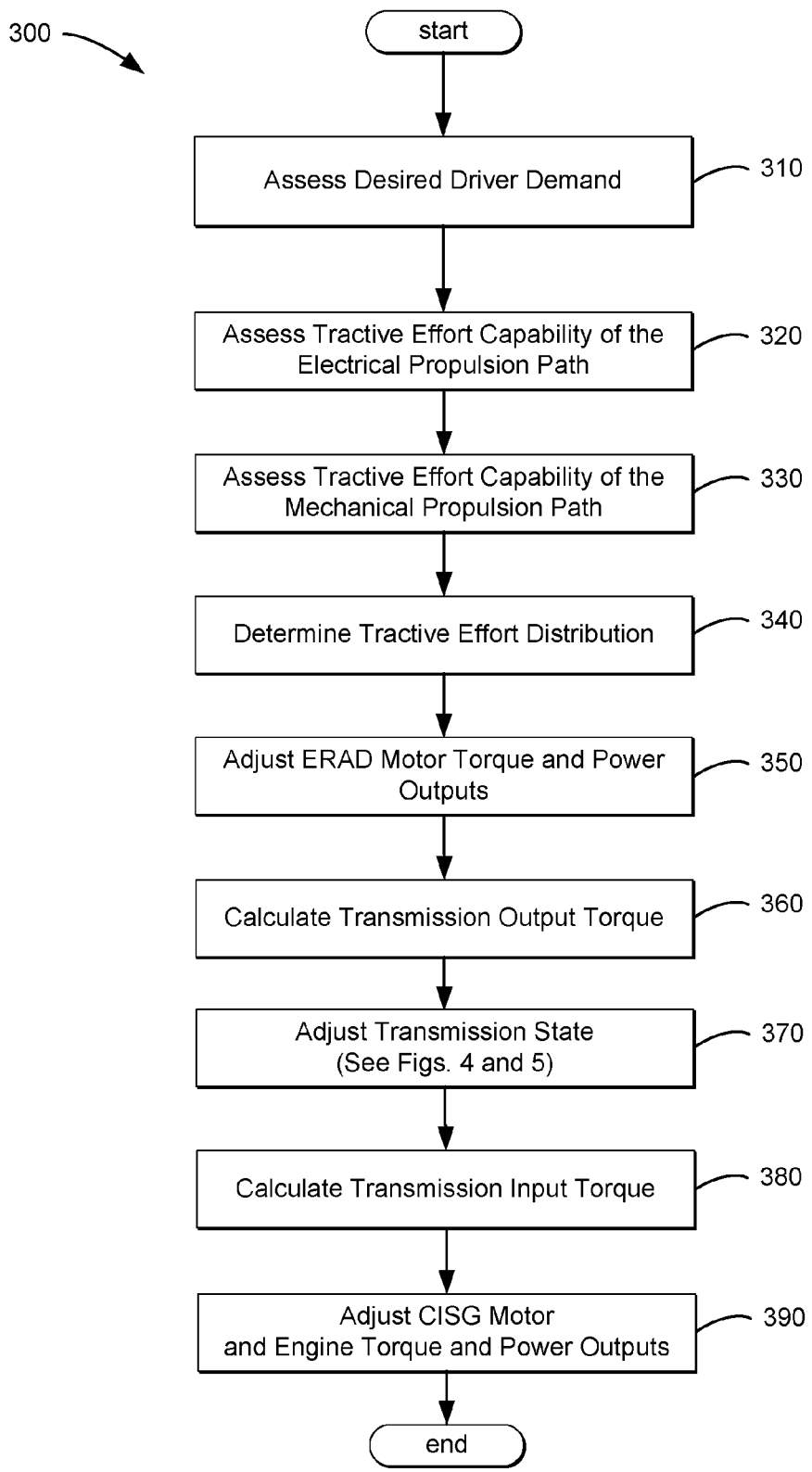
FIG. 3 is a flow diagram of a hybrid propulsion system control routine.
Figure 6:
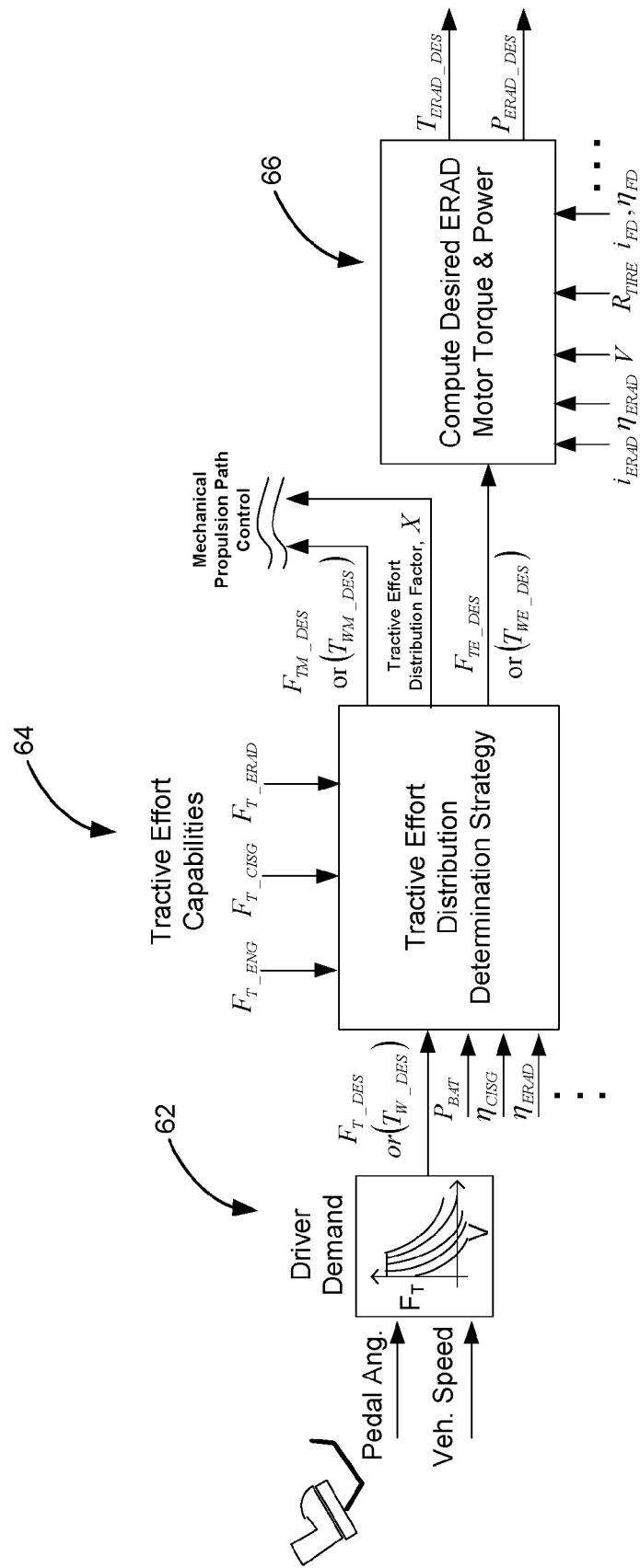
FIG. 6 is block diagram for the electric flow path of the hybrid propulsion system of FIG. 1.
Figure 7:
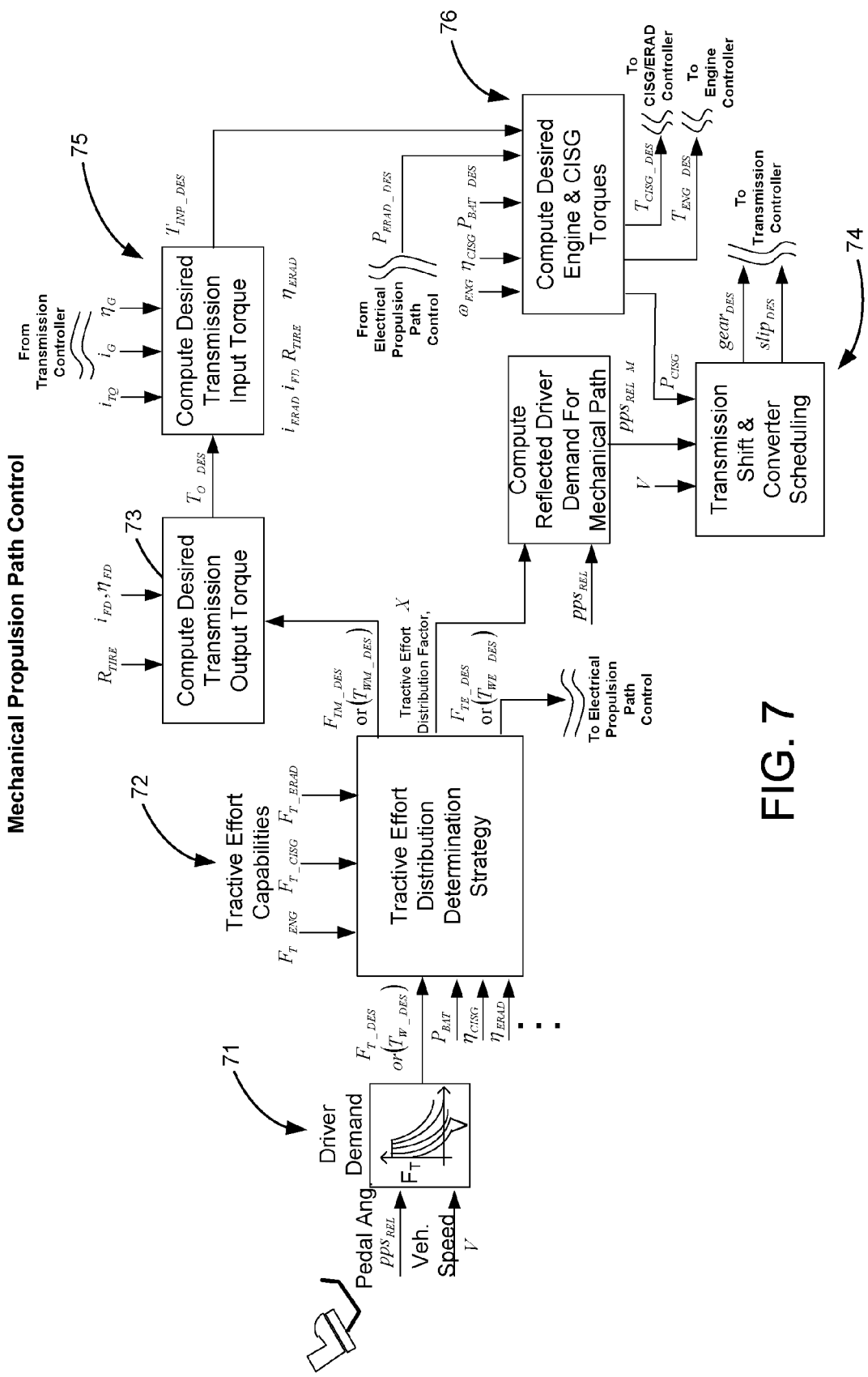
FIG. 7 is a block diagram for the mechanical flow path of the hybrid propulsion system of FIG. 1.

FIG. 3 shows a high-level hybrid propulsion distribution routine 300. FIGS. 6 and 7 schematically depict block diagrams for the electrical and mechanical flow paths. The block diagrams layout the various elements of the control routine as well as the operating parameters taken into consideration by the various elements.

Routine 300 begins at 310 where the desired driver demand is assessed at the current vehicle speed. The desired driver demand may be represented as the output torque or tractive effort (force) at the drive wheels. In one example, position of the accelerator pedal may be used to determine the desired driver demand. In another example, positions of both the accelerator and brake pedals may be used to determine the desired driver demand. Specifically in the first example, driver demand may be a function of vehicle speed and accelerator pedal position as shown in the equation provided below.

$$F_{T\_DES} = f(V, pps\_rel), \text{ or (torque-domain) } T_{W\_DES} = f(V, pps\_rel)$$

where, $F_{T\_DES}$: desired tractive effort (force) V: current vehicle speed, pps_rel: pedal position Driver demand is reflected in FIGS. 6 and 7 as block 62 and 71 respectively. As shown, pedal position and vehicle speed are taken into consideration and the result is the determined driver demand which may be the input of the next flow block.

Next at 320, routine 300 assesses the tractive effort capability of the electrical propulsion path. Specifically, the tractive effort capability of the electrical propulsion path may be assessed according to the tractive effort capability of the ERAD motor for the current vehicle speed. Furthermore, the current powertrain operating mode/conditions and the available battery power may be taken into account when determining the tractive effort capability of the electrical propulsion path. In one particular example, the tractive effort capability of the electrical propulsion path may be assessed according to the equations provided below.

$$F_{T\_E\_CAP} = F_{T\_ERAD} = \frac{[T_{ERAD} \cdot i_{ERAD}] \cdot i_{FD} \cdot \eta_{FD}}{R_{TIRE}},$$

$$\Rightarrow T_{ERAD} = \frac{P_{ERAD} \cdot \eta_{ERAD}}{\omega_{ERAD}},$$

$$\omega_{ERAD} = \left(\frac{V}{R_{TIRE}}\right) i_{ERAD} \cdot i_{FD},$$

$$\eta_{ERAD} = \begin{cases} \eta_{ERAD\_E2M}, & \text{motoring} \\ \dfrac{1}{\eta_{ERAD\_M2E}}, & \text{generating} \end{cases}, P_{ERAD} = P_{BAT} - P_{CISG},$$

where, $F_{T\_E\_CAP}$: tractive effort capability of electrical propulsion path, $F_{T\_ERAD}$: tractive effort capability from ERAD,
$i_{ERAD}$: ERAD gear ratio to motor, $T_{ERAD}$: torque provided by the ERAD, $\eta_{ERAD}$: ERAD efficiency,
$\omega_{ERAD}$: ERAD motor speed, $P_{CISG}$: CISG power, $P_{ERAD}$: ERAD power, $P_{BAT}$: battery power,
$\eta_{FD}$: final drive efficiency, $i_{FD}$: final drive ratio, V: vehicle speed, $R_{TIRE}$: effective tire radius Note that, in this example, the tractive effort capability of the electrical propulsion path may be affected by the efficiency of the ERAD motor which may be influenced by the operating speed, torque level and the SOC of the battery powering the motor. In addition, the ERAD motor's torque characteristics for the given operating speed and available electrical power may affect the tractive effort capability of the electrical propulsion path. Furthermore, the gear ratio and efficiency of the final drive and the gear ratio of the gears communicating with the motor may affect the tractive effort capability of the electrical propulsion path. In some embodiments, these gears may be manipulated to adjust the tractive effort capability of the electric propulsion path. For example, the gear ratio to the ERAD motor may be shifted between two ratios in order to increase the tractive effort capability at a given operating speed.

Next at 330, routine 300 assesses the tractive effort capability of the mechanical propulsion path. The tractive effort capability of the mechanical propulsion path may be assessed according to tractive effort capability of the IC engine and the CISG motor as a function of the transmission (and torque converter) state for the current vehicle speed. For example, if the torque converter is in a lockup state, then the efficiency of torque transmission is higher, thus requiring less engine and/or CISG motor torque. Furthermore, the current powertrain operating mode/conditions and the available battery power may be taken into account when determining the tractive effort capability of the mechanical propulsion path. For example, if the powertrain is in a battery charging mode, the CISG motor may have a negative (−) tractive effort capability, thus requiring the engine to produce greater torque output to meet driver demand. In one particular example, the tractive effort capability of the mechanical propulsion path may be assessed according to the equations provided below.

$$F_{T\_M\_CAP} = F_{T\_ENG} + F_{T\_CISG},$$

$$F_{T\_ENG} = \frac{[T_{ENG} \cdot i_{TQ} \cdot i_G \cdot \eta_G] \cdot i_{FD} \cdot \eta_{FD}}{R_{TIRE}},$$

$$F_{T\_CISG} = \frac{[T_{CISG} \cdot i_{TQ} \cdot i_G \cdot \eta_G] \cdot i_{FD} \cdot \eta_{FD}}{R_{TIRE}},$$

$$\Rightarrow T_{CISG} = \frac{P_{CISG} \cdot \eta_{CISG}}{\omega_{ENG}},$$

$$\eta_{CISG} = \begin{cases} \eta_{CISG\_E2M}, & \text{motoring} \\ \dfrac{1}{\eta_{CISG\_M2E}}, & \text{generating} \end{cases}, P_{CISG} = P_{BAT} - P_{ERAD}$$

where, $F_{T\_M\_CAP}$: tractive effort capability of mechanical propulsion path, $F_{T\_ENG}$: tractive effort capability of engine,
$F_{T\_CISG}$: tractive effort capability of CISG, $T_{CISG}$: torque provided by the CISG, $T_{ENG}$: torque provided by the engine
$\eta_{CISG}$: CISG efficiency, $P_{CISG}$: CISG power, $P_{ERAD}$: ERAD power, $P_{BAT}$: battery power,
$\omega_{ENG}$: engine speed, $\eta_G$: transmission gearbox efficiency, $i_G$: transmission gear ratio,
$i_{TQ}$: transmission torque converter torque ratio, $i_{FD}$: final drive ratio, $\eta_{FD}$: final drive efficiency It should be appreciated that the torque output provided by the CISG and ERAD motors, and their respective tractive effort capabilities change based on their characteristics (function of speed), available battery power (including charging needs) and power distribution (how battery power or engine power is distributed between the two electric machines in certain operating conditions). The tractive effort capabilities of the CISG and the IC engine are also a function of the transmission state (gear, torque converter). Accordingly, as vehicle operating conditions change, the battery state of charge (SOC) changes or the powertrain operating mode changes, the tractive effort capabilities of all three torque sources and each propulsion path will change.

At 340, routine 300 determines the tractive effort distribution between the mechanical and electrical propulsion paths for the desired driver demand. There can be multiple strategies for tractive effort distribution, based on a desired vehicle function. The distribution may be based on the respective tractive effort capabilities of the mechanical and electrical propulsion paths such that the sum of all tractive efforts is equal to the driver requested tractive effort (i.e. driver demand). The tractive effort distribution may also take into account whether or not the battery is to be charged. In one example, the distribution may be determined based on the most efficient propulsion path given equal tractive effort capabilities.

In another example, the tractive effort distribution strategy may take into account transient events such as a torque converter lock-up. For example, in order to enable and provide a smoother torque converter lock, the tractive effort distribution may increase propulsion from the electrical propulsion path during the lock-up event and then switch to another criterion for distribution following the transient event. In yet another example, where electrical propulsion may be provided on a different drive axle than that of mechanical propulsion, the tractive effort distribution may increase propulsion from the electrical propulsion path in order to improve vehicle stability during a condition of poor traction or unstable vehicle conditions. In one example, given the tractive effort distribution, X, the desired tractive effort for the mechanical and electrical propulsion paths may be determined according to the equations provided below.

$$F_{T\_DES} = F_{TM\_DES} + F_{TE\_DES}, \Rightarrow F_{TE\_DES} = X \cdot F_{T\_DES},$$
$$F_{TM\_DES} = (1-X) \cdot F_{T\_DES}$$

where, $F_{TM\_DES}$: desired tractive effort from mechanical path,
$F_{TE\_DES}$: desired tractive effort from electrical path
X: tractive effort distribution factor
(this can also be done in the torque domain)

$$T_{W\_DES} = F_{T\_DES} \cdot R_{TIRE} = T_{WM\_DES} + T_{WE\_DES}, \Rightarrow T_{WE\_DES} = X \cdot T_{W\_DES}, T_{WM\_DES} = (1-X) \cdot T_{W\_DES}$$

where, $T_{WM\_DES}$: desired wheel torque from mechanical path, $T_{WE\_DES}$: desired wheel torque from electrical path X: torque distribution factor In FIGS. 6 and 7, the tractive effort distribution determination blocks are represented by 64 and 72 respectively. The tractive effort distribution determination blocks take into consideration the driver demand ($F_{T\_DES}$) and the tractive effort capabilities of each of the torque sources ($F_{T\_ENG}$, $F_{T\_CISG}$, $F_{T\_ERAD}$) and produces the distributed tractive efforts for the electrical and mechanical propulsion paths. The desired battery power ($P_{BAT}$) and efficiencies of the respective hybrid powertrain elements also may be taken into consideration.

Note that an exemplary tractive effort distribution based on the efficiency of each propulsion path at the current vehicle speed and/or other criteria including powertrain operating mode (e.g. transmission and torque converter state) and battery charging needs is discussed in further detail below with reference to FIGS. 4 and 5.

Next at 350, routine 300 adjusts the ERAD motor torque contribution and power based on the desired tractive effort of the electrical propulsion path. The ERAD motor torque output adjustment and desired power may take into account the available electrical power, battery state of charge, power limits, and powertrain modes/conditions including gear ratios of the final drive as well as efficiency of the respective elements of the electrical propulsion path. The ERAD motor torque and power outputs may also take into account the planetary gear ratio coupling the ERAD motor to the transmission output.

Further, during transient events, such as a torque converter lock or shift, the ERAD torque and power may also be adjusted to enable smoother transient behavior and reduce overall driveline disturbances. In one particular example, the desired ERAD motor torque and power may be calculated according to the calculations provided below.

$$F_{TE\_DES} = X \cdot F_{T\_DES} = F_{T\_ERAD} = \frac{\lfloor T_{ERAD\_DES} \cdot i_{ERAD} \rfloor \cdot i_{FD} \cdot \eta_{FD}}{R_{TIRE}} \Rightarrow$$

$$T_{ERAD\_DES} = \frac{X \cdot F_{T\_DES} \cdot R_{TIRE}}{i_{ERAD} \cdot i_{FD} \cdot \eta_{FD}} = \frac{X \cdot T_{W\_DES}}{i_{ERAD} \cdot i_{FD} \cdot \eta_{FD}}$$

since $$T_{ERAD\_DES} = \frac{P_{ERAD\_DES} \cdot \eta_{ERAD}}{\omega_{ERAD}},$$

$$\omega_{ERAD} = \left(\frac{V}{R_{TIRE}}\right) i_{ERAD} \cdot i_{FD} \Rightarrow P_{ERAD\_DES} = \frac{T_{ERAD\_DES} \cdot \omega_{ERAD}}{\eta_{ERAD}}$$

where, $T_{ERAD\_DES}$: desired ERAD torque, $P_{ERAD\_DES}$: desired ERAD power, $\omega_{ERAD}$: ERAD motor speed, FIG. 6 shows ERAD motor torque and power calculation block 66. The desired tractive effort of the electrical propulsion path is input into the block and the efficiency and the gearing of the ERAD motor, the efficiency and the gearing of the final drive, vehicle speed, and the effective tire radius are taken into consideration in order to output the desired motor torque and power.

Next at 360, routine 300 calculates the desired transmission output torque contribution based on the desired tractive effort of the mechanical propulsion path. The desired transmission output torque provides the remainder of the torque output needed to meet driver demand beyond what torque is produced by the ERAD motor. In one particular example, the desired transmission output torque may be calculated according to the calculation provided below.

$$F_{TM\_DES} = (1-X) \cdot F_{T\_DES} = F_{T\_ENG} + F_{T\_CISG} =$$

$$\frac{T_{O\_DES} \cdot i_{FD} \cdot \eta_{FD}}{R_{TIRE}} = \frac{\lfloor T_{INP\_DES} \cdot i_{TQ} \cdot i_G \cdot \eta_G \rfloor \cdot i_{FD} \cdot \eta_{FD}}{R_{TIRE}} \Rightarrow$$

$$T_{O\_DES} = \frac{(1-X) \cdot F_{T\_DES} \cdot R_{TIRE}}{i_{FD} \cdot \eta_{FD}} = \frac{(1-X) \cdot T_{W\_DES}}{i_{FD} \cdot \eta_{FD}}$$

where, $T_{O\_DES}$: desired transmission output torque, $T_{INP\_DES}$: desired transmission input torque FIG. 7 shows transmission output torque computation block at 73. The desired tractive effort of the mechanical path determined in tractive effort distribution block 72 is input into block 73. The effective radius of the tire, and the efficiency and the gearing of the final drive are taken into consideration and the desired output torque is outputted to desired transmission input computation block 75.

Next at 370, routine 300 adjusts the state of the transmission (and/or torque converter) to meet the desired transmission output torque. Specifically, the transmission output torque may differ from the driver demand (i.e. torque provided to the final drive/wheels) corresponding to the tractive effort contribution (i.e. ERAD motor torque) of the electrical propulsion path. For example, as tractive effort distribution shifts towards the electrical propulsion path, the reflected driver demand for transmission shift and torque converter lockup scheduling will be reduced since the required transmission output torque is reduced. Accordingly, the shift schedule of the transmission can be adjusted to meet the modified torque demand. In some embodiments, the torque converter lockup schedule may be adjusted to further meet the modified torque demand. Furthermore, in some embodiments, the transmission shift and converter schedules also may be modified to compensate for the changing available power to the transmission since the input torque source can change depending on CISG power. For example, if the powertrain is in a battery charging mode, the available power to the transmission may be reduced since a portion of the engine power may be used to charge the battery through the CISG. Specific adjustment of the transmission and the torque converter will be discussed in further detail below with reference to FIGS. 4 and 5.

FIG. 7 shows transmission shift and torque converter scheduling block 74. The reflected driver demand for the mechanical propulsion path and the available power of the CISG motor are also taken into consideration in order to adjust the transmission shifting and torque converter lockup state. In some embodiments, the tractive effort distribution factor, X, or electrical propulsion path torque contribution could also be directly used in order to adjust the state of the transmission. Transmission shift and torque converter scheduling block 74 outputs the final desired gear and torque converter state based on the adjusted shift and torque converter lockup schedules.

Next at 380, routine 300 calculates the desired transmission input torque based on the actual state of the transmission. The desired transmission input torque may be provided by the CISG motor and/or the IC engine. In one particular example, the desired transmission input torque may be calculated according to the calculation provided below.

$$T_{O\_DES} = T_{INP\_DES} \cdot i_{TQ\_ACT} \cdot i_{G\_ACT} \cdot \eta_G =$$

$$(T_{ENG\_DES} + T_{CISG\_DES}) \cdot i_{TQ\_ACT} \cdot i_{G\_ACT} \cdot \eta_G \Rightarrow$$

$$T_{INP\_DES} = \frac{T_{O\_DES}}{i_{TQ\_ACT} \cdot i_{G\_ACT} \cdot \eta_G}$$

where $\eta_G$: transmission gearbox efficiency, $i_{G\_ACT}$: actual transmission gear ratio, $i_{TQ\_ACT}$: actual transmission torque converter torque ratio, $T_{INP\_DES}$: desired transmission input torque FIG. 7 shows desired transmission input torque computation block 75. The desired output torque computed in block 73 is input into block 75 and the actual state of the torque converter, the actual state of the transmission gear ratio, and the efficiency (or losses) of the transmission are taken into consideration when computing the desired transmission input torque in block 75.

Next at 390, routine 300 adjusts the CISG motor and IC engine torque contributions to meet the desired transmission input torque. The calculations of the respective torques of the IC engine and the CISG motor may depend on the battery SOC and powertrain operating mode. For example, if battery SOC is low and needs charging, the engine torque can be increased since the CISG torque will be negative (–), such that the desired input torque can be met while charging the batteries. In this example, the tractive effort capability of the CISG would have been negative (–) when determining the tractive effort capability of the mechanical path at 330. In the charge neutral (i.e. battery is not charged/discharged) case where the engine power is split, the tractive effort capability of the CISG would also be negative (–). In one particular example, the respective torques of the IC engine and the CISG motor may be based on the functions provided below.

given $P_{ERAD\_DES}$, since $P_{BAT\_DES} = P_{CISG\_DES} + P_{ERAD\_DES} \Rightarrow P_{CISG\_DES} =$ $$P_{BAT\_DES} - P_{ERAD\_DES} = \frac{T_{CISG\_DES} \cdot \omega_{ENG}}{\eta_{CISG}} \Rightarrow$$

$$T_{CISG\_DES} = \frac{P_{CISG\_DES} \cdot \eta_{CISG}}{\omega_{ENG}} = \frac{[P_{BAT\_DES} - P_{ERAD\_DES}] \cdot \eta_{CISG}}{\omega_{ENG}},$$

$$\eta_{CISG} = \begin{cases} \eta_{CISG\_E2M}, & \text{motoring} \\ \dfrac{1}{\eta_{CISG\_M2E}}, & \text{generating} \end{cases}$$

where, $P_{CISG\_DES}$: desired CISG power, $P_{ERAD\_DES}$: desired ERAD power, $T_{CISG\_DES}$: desired CISG torque, $P_{BAT\_DES}$: desired battery power, $\eta_{CISG}$: CISG efficiency, $\omega_{ENG}$: Engine speed Using the desired transmission input torque from step 380 and desired CISG torque, the desired engine torque can be calculated as follows:

$$T_{INP\_DES} = T_{ENG\_DES} + T_{CISG\_DES} \Rightarrow$$
$$T_{ENG\_DES} = T_{INP\_DES} - T_{CISG\_DES},$$

where $T_{ENG\_DES}$: desired engine torque

FIG. 7 shows desired engine and CISG motor torque computation block 76. The desired transmission torque is input from block 75 and the desired battery power, desired ERAD motor power, the efficiency of the CISG motor, engine speed and available engine power are taken into consideration in order to output the desired engine torque and the desired CISG motor torque. Note that under some conditions the CISG may convert mechanical power from the IC engine into electric power to charge the battery, as such, the CISG torque output may be negative (–).

Further, the combined torque of the IC engine and CISG motor may be transmitted through the fixed gear transmission and combined with the ERAD motor torque via the planetary gears to provide torque at the final drive/wheels to meet driver demand. Routine 300 ends after providing torque to meet the assessed driver demand. Routine 300 may be performed repeatedly throughout vehicle operation. Furthermore, it should be appreciated that routine 300 is exemplary and the routine may be applied to other hybrid powertrain configurations. Note that additional or optional determinations of tractive effort capabilities and distribution may be made for propulsion system configurations with additional propulsion paths. Further note that in some embodiments various assessments or determinations may be omitted from the routine. Hybrid propulsion distribution routine 300 facilitates effective distribution of the desired tractive effort into multiple propulsion paths (e.g. mechanical and electrical), thus providing improved control and performance due to the additional degrees of control freedom compared to a single propulsion path powertrain configuration.

Furthermore, during some operating conditions the torque at the final drive/wheels may be split between the electrical and mechanical propulsion paths to facilitate earlier shifting of the transmission. In one example, as can be illustrated in FIG. 2, the final drive/wheel torque may be directed through ERAD motor 16 and associated gears 22 such that the torque may be split between the output of transmission 14 and battery 20 in the form of electric power to charge the battery.

In some cases, the power split may facilitate ERAD motor 16 and CISG motor 12 to be adjusted cooperatively to reduce torque differential. For example, torque at the final drive/wheels may be split such that an amount of torque may be directed into the electrical propulsion path 26 via gears 22 and ERAD motor 16 which further may be used to power the CISG motor 12. Additionally, an amount of torque may be directed to the output of the transmission via gears 22 and ERAD motor 16. Accordingly, the CISG motor and the ERAD motor may be adjusted to reduce torque differential between the input and the output of the transmission, thus enabling earlier transmission shifts and/or smoother earlier torque converter lock-ups while also reducing the degree of adjustment of the individual torque sources. In yet another example, the IC engine may provide split power output to both the mechanical and electrical propulsion paths. Specifically, the IC engine may provide a portion of torque output to the CISG to charge the battery as well as a portion of torque output through the transmission to power the final drive/wheels.

Figure 8:
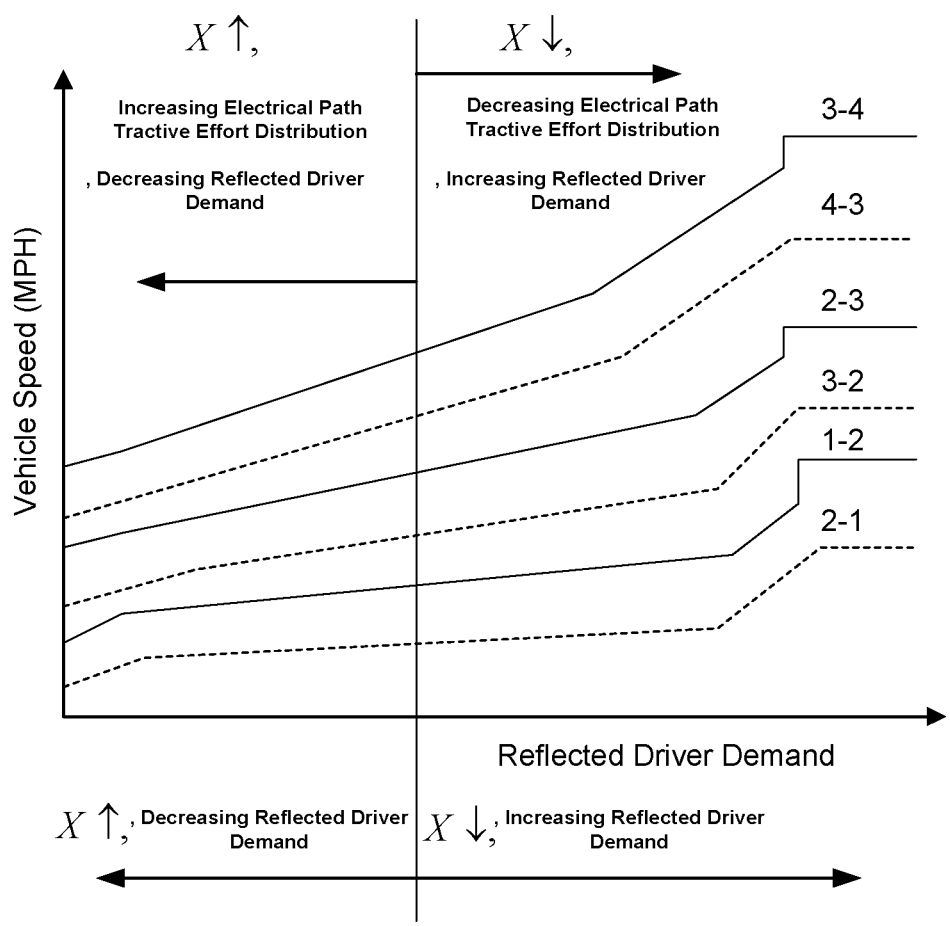
FIG. 8 is a transmission shift schedule chart.

The above described hybrid propulsion system control routine facilitates straightforward implementation of various strategies for tractive effort distribution based on a desired vehicle function. As discussed above, in routine 300 at 370, by adjusting the state of the transmission the hybrid powertrain may be adjusted for different operating modes/conditions. Specifically, the shift schedule may be adjusted according to the tractive effort distribution between the mechanical and electrical propulsion paths. As shown in FIG. 8, the transmission shift schedule changes gear ratios based on vehicle speed and reflected driver demand. The reflected driver demand (the demand at the transmission output) may be influenced directly by the tractive effort capability and propulsion contribution of the electrical propulsion path (i.e. ERAD motor torque contribution). Therefore, in one example, the state of the transmission (gear and/or torque converter state) can be adjusted based on the state of charge of the battery since the state of charge of the battery directly affects the tractive effort capabilities of the ERAD motor and the CISG motor.

Figure 4:
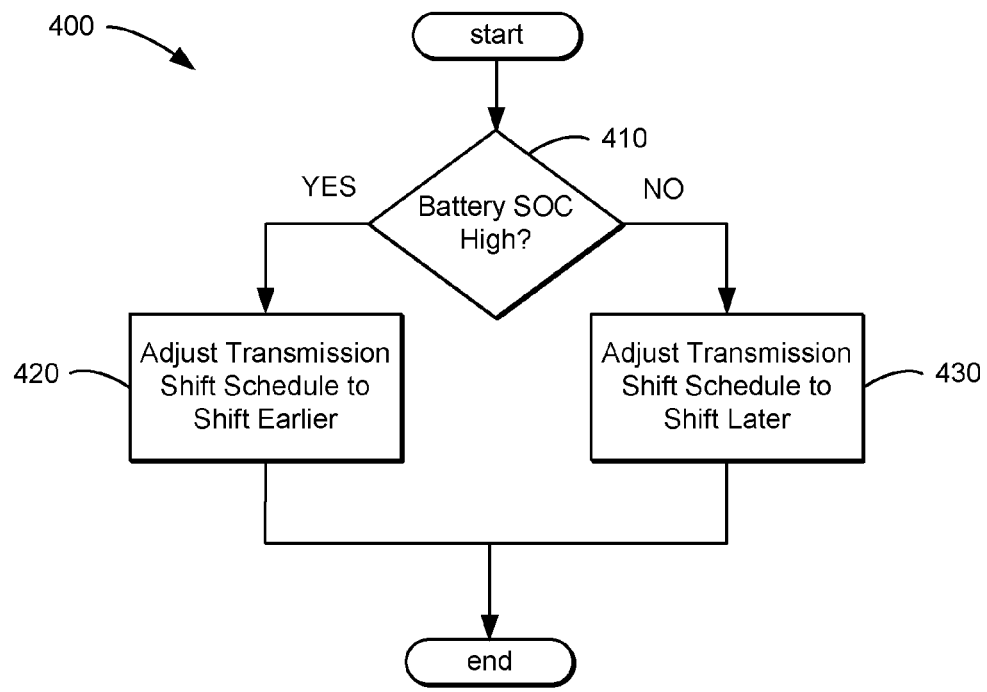
FIG. 4 is a flow diagram of a transmission shift schedule adjustment routine.

Now turning to FIG. 4, hybrid powertrain control routine 400 is shown. Routine 400 begins at 410, where it is determined if the battery state of charge (SOC) is high. If it is determined that SOC is high, then routine 400 moves to 420. Otherwise, routine 400 moves to 430.

If it is determined that the battery SOC is high, it can be interpreted as increased electrical propulsion path tractive effort capability (e.g. high torque output by the ERAD motor), which in turn can be reflected as decreased tractive effort required by the mechanical propulsion path. In other words, given an overall driver desired tractive effort, if less tractive effort (and less output torque) is required from the mechanical path, then accordingly a lower reflected driver demand to the transmission is required. Thus, as noted at 420, the shift schedule can be adjusted to reflect the lower torque output of the transmission. Namely, the transmission shift schedule can be adjusted so shift points occur earlier in the powerband. By adjusting the transmission shift schedule so that shift points occur earlier when the battery SOC is high, the powertrain may be configured to improve powertrain efficiency which improves the fuel economy performance of the hybrid powertrain while still meeting driver demand.

The hybrid propulsion system configuration advantageously provides added degrees of control freedom to meet driver demand while improving powertrain efficiency. Specifically, since the hybrid propulsion system is configured with the ERAD motor located downstream of the transmission output, torque may be supplied via the ERAD motor to meet driver demand independent of the transmission. As such, the torque demand at the output of the transmission may be reduced substantially proportionate to the output of the ERAD motor. The reduced torque demand facilitates earlier shifting between the gear ratios of the transmission since each of the gear ratios may have the capacity to suitably transfer the desired torque. Accordingly, by transitioning between gear ratios of the transmission earlier (e.g. at lower engine speeds) fuel economy performance can be improved over hybrid powertrains configurations with all torque sources located upstream from the transmission, which require all torque to transfer through the transmission leading to later gear ratio transitions and lower transmission efficiency.

On the other hand, if it is determined that the battery SOC is not high, routine 400 moves to 430. Similar to above, decreased battery SOC can be interpreted as decreased electrical path tractive effort capability which can be reflected as increased driver demand and tractive effort required by the mechanical propulsion path. If more tractive effort (or more output torque) is required at the output of the transmission, then the transmission shift schedule can be adjusted so shift points occur later in the powerband and torque can be suitably transferred in order to handle the transmission output torque demand. By adjusting the transmission shift schedule so shift occur later, the powertrain may be configured to improve vehicle output (or torque) performance to meet the driver demand. Further the IC engine output may be increased to also meet battery charging needs.

Note that in some embodiments the shift schedule may be adjusted according to rpm level, gear ratio, or other suitable powertrain parameter.

Hybrid powertrain control routine 400 adjusts the state of the transmission based on the state of charge of the battery in order to improve the efficiency of the hybrid powertrain as well as improve the fuel economy performance when battery power and state of charge is high. Further, the control routine adjusts the hybrid powertrain so that enough power may be generated to charge the battery and meet driver when the state of charge is low. In some embodiments routine 400 may adjust the transmission shift schedule directly based on the ERAD motor torque contribution since the ERAD motor may be powered by the battery and indirectly via the IC engine. Additionally, in some embodiments, the transmission shift schedule may be adjusted based on the changes in available input power to the transmission. For example, if a portion of the engine power is used to charge the battery, a downshift may be scheduled earlier to take advantage of the additional input power in the lower gear in order to meet the driver demand.

Further, the control approach facilitates adjustment of the various torque sources cooperatively to improve efficiency of the hybrid powertrain while still meeting driver demand. Moreover, having two torque sources as inputs to the transmission provides an additional degree of freedom. For example, given a desired input torque to the transmission, if the battery needs to be charged using the CISG, the IC engine torque may be increased such that the combined torques of the IC engine and CISG meets the required input torque to the transmission to achieve the required output torque of the mechanical propulsion path. Unlike a single power/energy flow powertrain configuration, the ability to distribute tractive effort contributions between the two propulsion paths and the ability to distribute the battery power between the two electric machines adds new degrees of freedom for improving control of powertrain operation.

Figure 9:
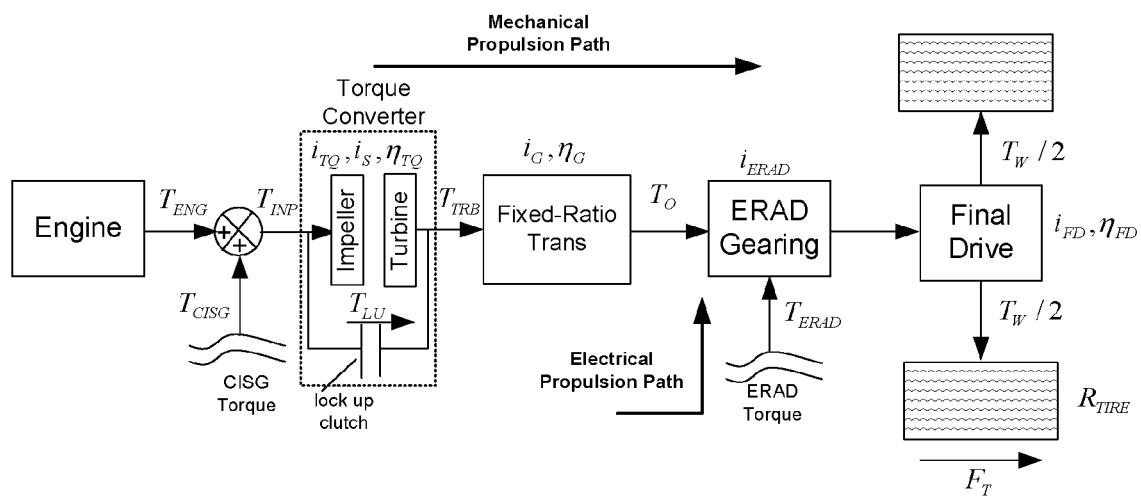
FIG. 9 is a block diagram of a hybrid propulsion system illustrating various propulsion paths.

Furthermore, in some embodiments, the torque converter lockup state may be adjusted based on the battery SOC which advantageously provides another degree of control of the hybrid powertrain. In particular, since the battery provides power to two motors (i.e. the CISG motor and the ERAD motor) on either side of the torque converter, the motors may be controlled to adjust torque differences at the input and output of the torque converter as well as to provide supplemental torque to the final drive/wheels as shown in FIG. 9 and discussed in further detail below.

Figure 5:
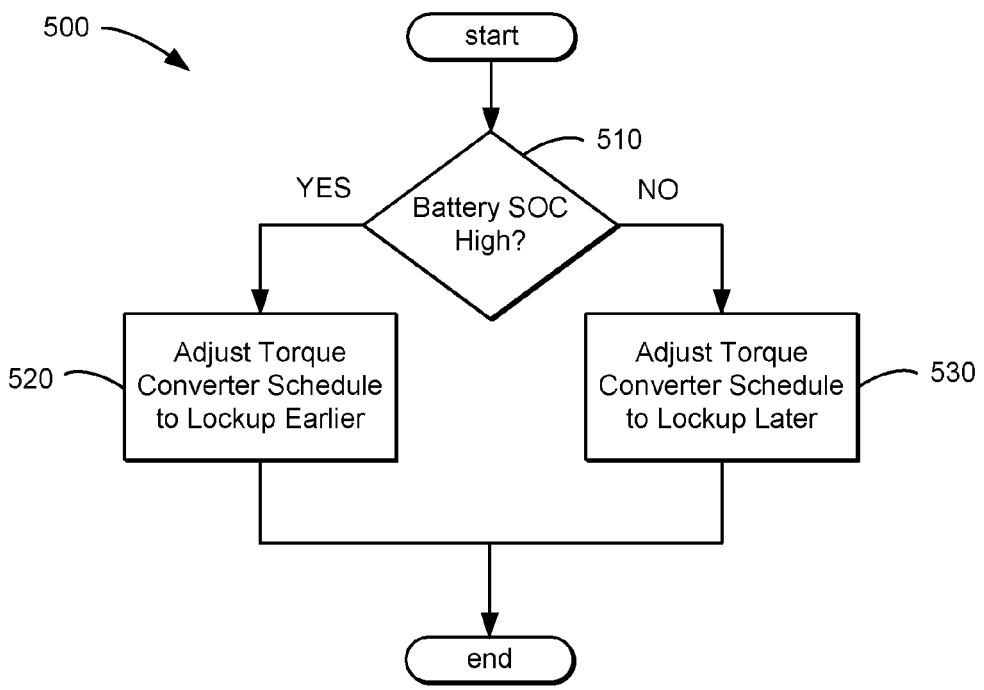
FIG. 5 is a flow diagram of a torque converter lockup schedule adjustment routine.

FIG. 5 shows a hybrid powertrain control routine 500 for adjusting the torque converter lockup schedule based on battery SOC. Routine 500 begins at 510, where it is determined if the battery state of charge (SOC) is high. If it is determined that SOC is high, then routine 500 moves to 520. Otherwise, routine 500 moves to 530.

If it is determined that the battery SOC is high it can be interpreted as increased electrical propulsion path tractive effort capability, which in turn can be reflected as decreased tractive effort required by the mechanical propulsion path. The decreased mechanical path tractive effort translates into reduced torque converter output torque. Thus, as noted at 520, the torque converter schedule can be adjusted to reflect the lower desired torque output of the torque converter. Namely, the state of the torque converter (i.e. the torque converter lockup schedule) can be adjusted so lockup occurs earlier since the changes in driver demand (e.g. an increase in required torque) may be handled by the ERAD motor while maintaining the same IC engine speed and lockup conditions. By adjusting the torque converter lock up schedule to lock up earlier when battery SOC is high, the powertrain may be configured for improved overall efficiency which improves fuel economy performance while still meeting driver demand. Note that, during some conditions, the torque converter and the transmission may be adjusted to improve powertrain efficiency when battery SOC is high.

On the other hand, if it is determined that the battery SOC is not high, routine 500 moves to 530. Similar to above, decreased battery SOC can be interpreted as decreased electrical path tractive effort capability which can be reflected as increased driver demand to the torque converter output since the ERAD motor may not be capable of providing supplemental torque to the final drive/wheels. If more tractive effort (or more output torque) is required from the mechanical propulsion path, then the state of the torque converter (i.e. the torque converter lockup schedule) can be adjusted so that unlock occurs earlier so that the transmission output may be increased to handle to increased torque demand. By adjusting the torque converter schedule so that the lockup clutch locks up later and/or unlocks earlier when battery SOC is low, the powertrain may be configured to improve vehicle output (or torque) performance to meet driver demand while still meeting battery charging needs.

Hybrid powertrain control routine 500 adjusts the state of the torque converter based on the state of charge of the battery in order to improve the efficiency of the hybrid powertrain which in turn improves the fuel economy performance of the hybrid powertrain when the battery power and SOC is high. Further the control routine facilitates torque converter adjustment to provide enough power to charge the battery when the battery SOC is low. In some embodiments, the state of the torque converter may be adjusted directly based on the ERAD motor torque contribution since the ERAD motor may be powered by the battery and indirectly via the IC engine. Further, in some embodiments routine 500 may also adjust the state of the torque converter based on the changes in available input power to the transmission. For example, if a portion of the engine power is used to charge the battery, the torque converter may be unlocked earlier to increase the torque multiplication across the converter and overall transmission torque output in order to meet the driver demand.

It should be appreciated that in some embodiments, both routine 400 and 500 may be carried out to compensate for changes in tractive effort distribution. For example, the shift schedule may be adjusted to correspond with locking and unlocking of the torque converter so that the transition in and out of torque converter lockup may be carried out smoother and/or torque converter lockup may be extended for a longer period. In one example control approach the transmission and torque may be adjusted independently of each other based on different operating conditions.

Further in some embodiments, the transmission and torque converter scheduling may be adjusted based on a threshold value of the battery state of charge. In some embodiments, different transmission shift and torque converter schedules may correspond to different states of charge of the battery.

Note that even with full battery power (SOC), the tractive effort capabilities of the additional torque sources may be lost due to vehicle operating conditions. Thus, in some embodiments the hybrid powertrain control approach may consider the torque/efficiency capabilities and characteristics of different sources when adjusting the state of the transmission gear ratio and/or the torque converter.

During some conditions, the CISG and the ERAD may provide supplemental torque output in order to lockup the torque converter earlier. The supplemental torque may also prevent the torque converter from unlocking and provides a smoother engagement of the converter lock-up clutch. The ability to increase the turbine torque at the output of the torque converter by increasing the ERAD motor torque enables an earlier and smoother torque converter lock during operating conditions where a considerable torque differential across the torque converter would otherwise exist which would normally exceed the capacity of the lockup clutch.

Figure 10:
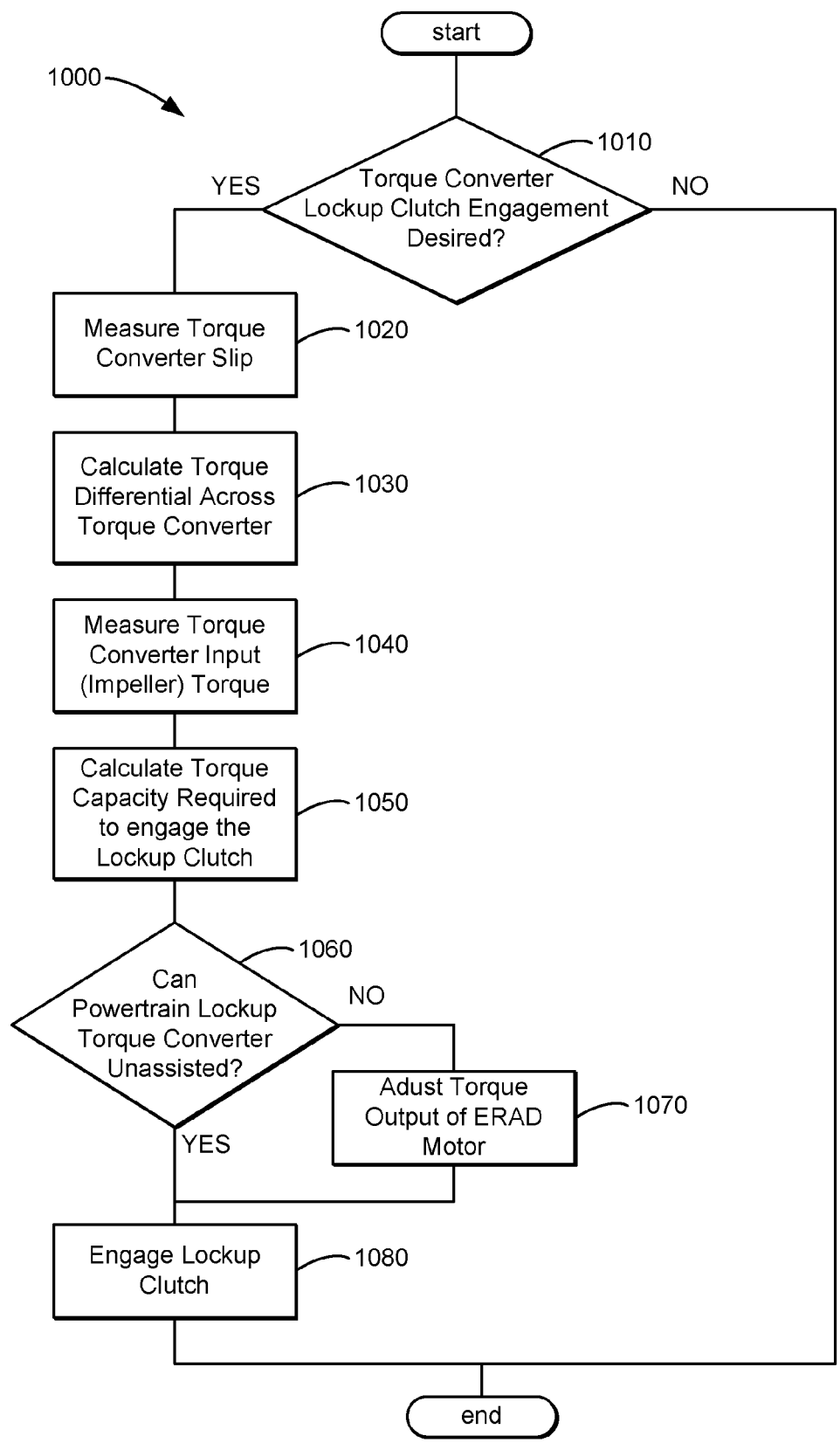
FIG. 10 is a flow diagram of a torque converter lockup control routine.

FIGS. 9 and 10 correspond to a routine and propulsion distribution paths for controlling the torque distribution in the hybrid propulsion system so that the torque converter may be locked during various operating conditions. As discussed above, during some operating conditions, torque differential of the torque converter may be such that a lockup state of the torque converter may be undesirable due to increased roughness and reduced drivability. Moreover, during some conditions lockup of the torque converter may not be possible due to the magnitude of the torque differential. Thus, it may be beneficial to adjust the ERAD motor to reduce the torque differential of the torque converter so that lockup may be possible and/or may occur earlier.

For example, with reference to FIG. 9, during an operating condition where the input (impeller) torque ($T_{INP}$) of the torque converter is lower than the turbine torque ($T_{TRB}$) of the torque converter (i.e. a torque differential) it may be impossible or undesirable to lockup the torque converter because the torque differential exceeds the torque capacity ($T_{LU}$) of the lockup clutch, among other lockup parameters. Thus, in order to make lockup of the torque converter possible and/or smoother, the torque of the ERAD motor ($T_{ERAD}$) may be increased. In particular, increasing the ERAD torque ($T_{ERAD}$) effectively reduces the turbine torque ($T_{TRB}$) which in turn reduces the torque differential across the torque converter while increasing the speed ratio so that the capacity of the lockup clutch will be sufficient to smoothly lock the torque converter at the desired operating condition. Further, by using the ERAD motor to provide supplemental torque to meet driver demand, the impeller torque ($T_{INP}$) can be reduced so that the required capacity of the lockup clutch to lock the converter will also be reduced.

Referring now to FIG. 10, an exemplary torque converter lockup clutch engagement routine is shown. The control routine 1000 may be implemented to engage the lockup clutch of the torque converter across various operating ranges of the hybrid propulsion system. The control routine advantageously adjusts the output torque of the ERAD motor during operating conditions where the torque differential across the torque converter prevents engagement of the lockup clutch. Specifically, the ERAD torque adjustment effectively reduces (or increases in some cases) the turbine torque at the output of the torque converter leading to a reduced torque differential enabling engagement of the lockup clutch that would not be possible otherwise. Further, the ERAD torque assist provides torque to meet driver demand while increasing the efficiency of the powertrain via the locked state of the torque converter.

Routine 1000 begins at 1010 where it is determined if torque converter lockup clutch engagement is desired. As discussed above, locking up the torque converter may be desirable because torque converter slippage may be eliminated and efficiency of the torque converter may be increased. The determination may be based on different operating parameters such as torque converter input torque, turbine torque and torque demand, among others. If it is determined that engagement of the torque converter lockup clutch is not desired then routine 1000 ends. If it is determined that engagement of the torque converter lockup clutch is desired then routine 1000 moves to 1020.

At 1020, the routine measures the amount of torque converter slippage which may be used to determine if unassisted engagement of the lockup clutch is possible and desirable.

Next at 1030, the torque differential across the torque converter is calculated (or estimated) as a function of the measured torque converter slip.

Next at 1040, the routine measures the torque converter input (impeller) torque which may be used to determine if unassisted engagement of the lockup clutch is possible and desirable.

Next at 1050, using the measured converter slip from step 1020, and input torque from step 1040, the routine calculates (or estimates) the required torque capacity of the lockup clutch which may be used to determine if unassisted engagement of the lockup clutch is possible and desirable. In some embodiments, the required lock-up clutch torque capacity may be calculated and commanded based on the torque converter input torque as well as an I-alpha torque which is a function of the converter slip and inertias that accelerate/decelerate during the lock-up event.

Next at 1060, the routine determines if it is possible to engage the lockup clutch of the torque converter based on the torque differential across the torque converter. The determination may be made based on one or more of the measured torque converter slip, measured input (impeller) torque, and/or the required lock-up clutch torque capacity of the torque converter. For example, the torque converter lockup determination may be made based just on torque converter slip. In some embodiments, the determination may take into account lockup smoothness based on the measured parameters. Accordingly, if lockup smoothness is assessed to be beyond a desired level it may be determined that the lockup clutch cannot be engaged without assistance.

Note that in some embodiments, the various operating parameters may be inferred and/or calculated based on other operating parameters instead of being measured. In some embodiments, the lockup determination may consider other operating conditions besides torque differential to engage the lockup clutch. In some embodiments, the determination may consider various levels of possible and desirable lockup clutch engagement. For example, full engagement of the lockup clutch may be desired. As another example, partial lockup clutch engagement may be desired. Thus, the determination may be altered according to the level of engagement of the lockup clutch.

If it is determined that the lockup clutch can be engaged without assistance the routine moves to 1070. Otherwise if it is determined that the lockup clutch cannot be engaged without assistance the routine moves to 1060.

At 1070, the torque output of the ERAD motor may be adjusted to reduce the torque differential across the torque converter so that the torque converter may be engaged. The amount of torque adjustment may take into account torque converter slip, input (impeller) torque, and required torque capacity of the lockup clutch. In one example torque may be adjusted so that these parameters fall within a desired operating range where it is desirable to engage the lockup clutch. Note, torque output of the ERAD may be increased or decreased according to the torque differential across the torque converter.

Next at 1080, the lockup clutch is engaged, the torque converter enters a lockup state, and the routine ends.

The control routine advantageously adjusts the output torque of the ERAD motor during operating conditions where the torque differential across the torque converter prevents engagement of the lockup clutch. The torque adjustment enable engagement of the lockup clutch that otherwise would not be possible due to the operating conditions. In this way, torque may be provided to meet driver demand while increasing the efficiency of the powertrain by enabling the torque converter to enter a locked state.

Furthermore in some embodiments, the CISG motor and the ERAD motor may be adjusted concurrently so that the respective torque adjustment of the input torque and the output torque of the torque converter may be reduced. In other words, by adjusting both the CISG motor and the ERAD motor, the torque differential across the torque converter may be reduced facilitating earlier lockup of the clutch while also reducing the degree of adjustment of the individual torque sources. The corresponding adjustment of the electric motors may lead to increased powertrain efficiency and improved fuel economy as well as smoother torque converter lockup due to the reduced degree of adjustment of the torque sources. Note that in hybrid propulsion system configurations without a CISG motor, the ERAD motor may be adjusted to reduce torque differential to facilitate torque converter lockup/unlock.

Note that the ERAD motor may be controlled to compensate for positive and negative torque differentials across the transmission and/or the torque converter.

In some embodiments, control of the hybrid propulsion system may also take into consideration the state of the catalyst (e.g. at light-off temperature or not at light-off temperature) when determining the tractive effort distribution. Specifically, the use of the electric motors may be reduced and/or delayed based the temperature of the catalyst. For example, at startup or during cold conditions the IC engine may be used to warm up the catalyst. Once the catalyst reaches the light-off temperature, the use of the electric motors may be enabled and the tractive effort capability of the electric propulsion path may be taken into consideration.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of adjusting torque output of a hybrid propulsion system, the hybrid propulsion system including an internal combustion engine to produce torque to a torque converter coupled to a multiple fixed-ratio transmission for transmitting torque to a wheel, and a first electric motor positioned upstream of the torque converter and powered at least by a battery to supply torque to the wheel, the method comprising:
shifting the multiple fixed-ratio transmission from a first gear ratio to a second gear ratio upon a first condition and adjusting a lockup state of the torque converter in response to a first state of battery charge interpreted as an indication of increased electrical propulsion path tractive effort capability, the indication of increased electrical propulsion path tractive effort capability reflected as a decrease in tractive effort from a mechanical propulsion path;
shifting the multiple fixed-ratio transmission from the first gear ratio to the second gear ratio upon a second condition that is different from the first condition and adjusting said lockup state of the torque converter in response to a second state of battery charge interpreted as an indication of decreased electrical propulsion path effort capability reflected as an increase in tractive effort from said mechanical propulsion path; and
adjusting torque output of said first electric motor to reduce a torque differential across the torque converter and to assist locking a torque converter lockup clutch in response to said first and second states of battery charge.

2. The method of claim 1, further comprising shifting the multiple fixed-ratio transmission during acceleration according to a first shift schedule in response to the first state of battery charge, and shifting the multiple fixed-ratio transmission during acceleration according to a second shift schedule in response to the second state of battery charge.

3. The method of claim 2, further comprising increasing output from the internal combustion engine in response to the second state of battery charge and further adjusting a torque converter lockup schedule to increase output of the multiple fixed-ratio transmission, and where the second state of battery charge is less than the first state of battery charge.

4. The method of claim 2, further comprising increasing the torque output of the first electric motor to reduce the torque differential across the torque converter in response to when an unassisted torque converter lockup capacity is insufficient to lock the torque converter.

5. The method of claim 3, further comprising adjusting a shift schedule of the multiple fixed-ratio transmission according to tractive effort distribution between separate parallel mechanical and electrical propulsion paths.

6. The method of claim 2, wherein shifting the multiple fixed-ratio transmission includes shifting when the torque converter is in an unlocked state.

7. The method of claim 1 further comprising adjusting a lockup state of the torque converter lockup clutch based on a catalyst temperature, and further comprising when an unassisted torque converter lockup clutch capacity is insufficient to lock the torque converter, increasing torque output of a second electric motor positioned downstream of the first electric motor and increasing engine torque absorption of the first electric motor to charge the battery while engaging the torque converter lockup clutch to lock up the torque converter.

8. The method of claim 1, further comprising adjusting the torque output of the first electric motor during shifting of the multiple fixed-ratio transmission.

9. The method of claim 1, further comprising adjusting torque output of a second electric motor to reduce the torque differential.

10. The method of claim 7, where the second electric motor is positioned in parallel with the multiple fixed-ratio transmission.

* * * * *